Dec. 17, 1963 M. E. ARTHUR 3,114,883

REVERSIBLE ELECTRONIC COUNTER

Filed Aug. 29, 1961 3 Sheets-Sheet 1

INVENTOR
MERWYN E. ARTHUR

BY Paul D. Carmichael

ATTORNEY

Dec. 17, 1963 M. E. ARTHUR 3,114,883

REVERSIBLE ELECTRONIC COUNTER

Filed Aug. 29, 1961 3 Sheets-Sheet 3

3,114,883

REVERSIBLE ELECTRONIC COUNTER

Merwyn E. Arthur, Endicott, N.Y., assignor to International Business Machines Corporation, New York, N.Y., a corporation of New York Filed Aug. 29, 1961, Ser. No. 134,640
9 Claims. (Cl. 328—44)

The present invention relates generally to the electronic arts and more particularly to the provision of an improved reversible electronic counter.

In the computing art there is often the need for a device which will count to and from variable quantities and provide a representation of the count at any particular instant in time. For example, in transferring binary coded information quantities to a digital computer utilizing floating point operations, it is necessary to record the number of places an information quantity is shifted to the left or right. As will be understood by those skilled in the art, an information quantity of a floating point digital computer is represented by a magnitude or mantissa times a variable power or exponent of a radix. Addition or subtraction of the information quantities requires normalization by shifting to the left or right so that the exponents of the information quantities to be added or subtracted are the same. The number of places shifted, as indicated by the number in the counter, is the change in the exponent for a normalized information quantity.

Typical high speed counting circuits of the prior art comprise cascaded triggers. Each trigger is settable to either of two stable states and the states assumed by the cascaded triggers are each indicative of the values entered into the counter. Such an arrangement limits the counting speed or pulse input rate since, in the worst case, the input pulse to be counted must ripple through all the triggers of the counter. The direction of counting is determined by which output of any intermediate trigger is connected to the input of the succeeding trigger. Complicated and relatively slow acting gating circuits are employed for switching the inputs to all of the triggers except the first. When the counter is reversed, the inputs to the triggers must be switched slowly enough so that the present states of the triggers are not changed. In many instances it is impossible to preset the counter at a particular number and/or to reverse or recycle the counter when a desired and variable number is reached.

Briefly, the present invention relates to a reversible electronic counter comprising counting and steering elements. The counting elements are responsive to the pulse inputs to indicate the count while the steering elements pre-condition the counting elements prior to the receipt of a succeeding pulse. The counting elements simultaneously change state at the beginning of a pulse to be counted while the steering elements simultaneously change state at the end of a pulse. The resultant speed of the counter is limited only by the time required for any one counting or steering element to change state. The count is immediately available after a pulse has been applied and the counter can be interrogated at any time.

Separate gating means for forward and reverse counting are provided for each of the counting and steering elements. To reverse the direction of count, the appropriate gating means associated with each counting and steering element are energized but, providing a change in the direction of count is accomplished between successive pulses to be counted, only the steering elements change state. The counting elements do not change state at this time and the number stored in the counter remains the same.

Means are provided for presetting the counter at any variable quantity. In addition, this means allows the resetting or recycling of the counter after any variable quantity has been counted.

It is the primary or ultimate object of the present invention to provide an improved reversible electronic counter which is capable of operating at an extremely high speed and is reliable.

Another object of the invention is to provide a reversible counter having counting and steering elements wherein the counting elements change state at the beginning of a pulse to be counted and the steering elements change state at the end of the pulse.

Yet another object of the invention is to provide a reversible electronic counter wherein only the steering elements change state when the direction of count is reversed.

A further object of the invention is the provision of a reversible electronic counter having means to enter any desired number into the counter and for recycling or reversing the direction of count whenever a desired number of pulses have been counted. This desired number of pulses may be less than the capacity of the counter.

Still a further object of the invention is to provide a counter of the type set forth in the above objects which is highly simplified in construction and operation. A plurality of internal logic functions are performed in the counter and all of these functions are provided by only two types of circuits.

The foregoing and other objects, features and advantages will be apparent from the following more particular description of a preferred embodiment of the invention, as illustrated in the accompanying drawings.

Figure 1:
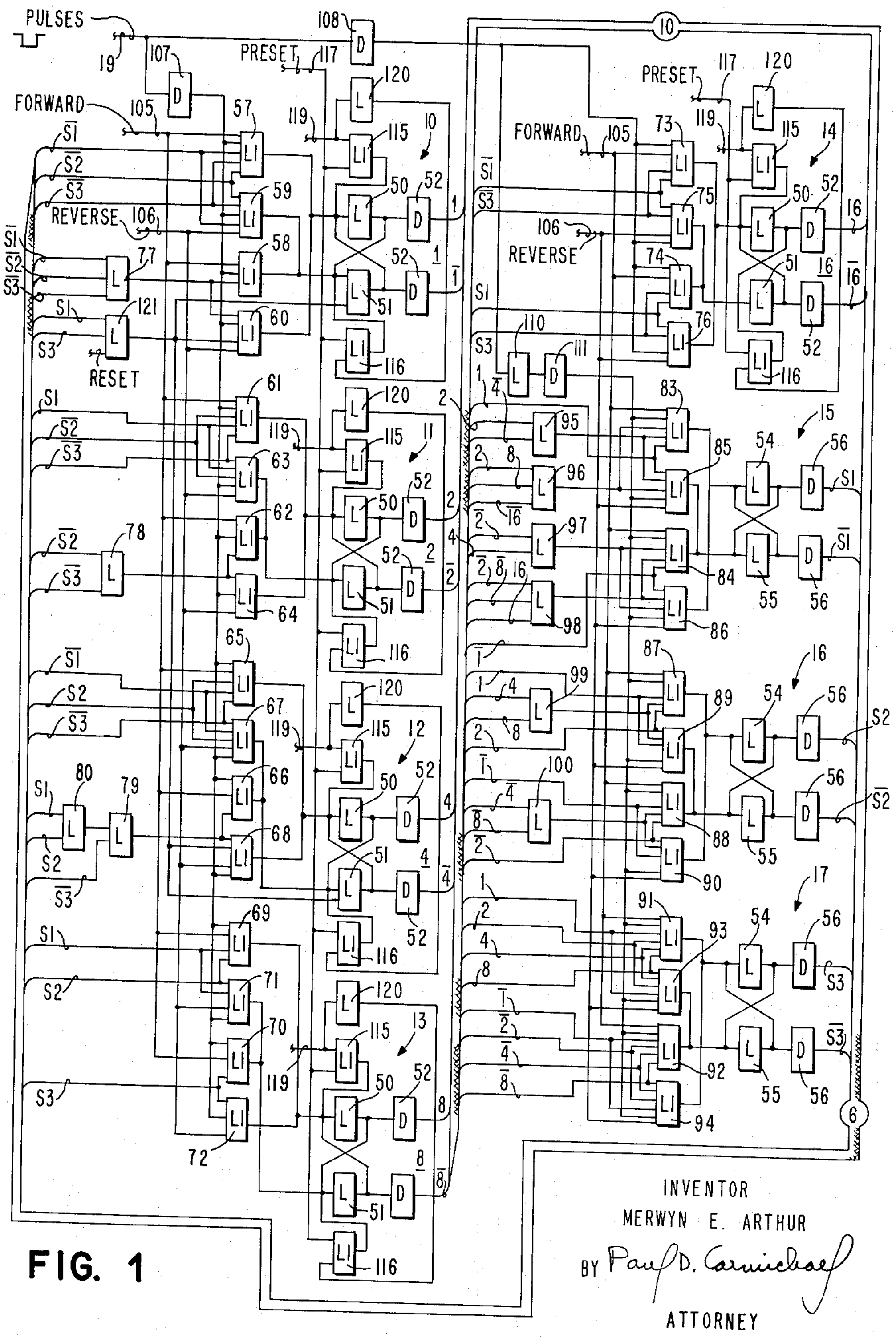
FIGURE 1 is a schematic circuit diagram of a reversible electronic counter constructed in accordance with the teachings of the present invention.
Figure 2:
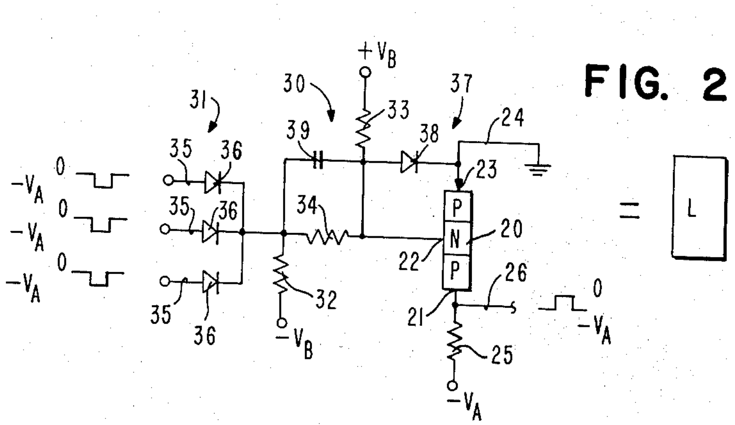
FIGURE 2 is a detailed circuit diagram of the basic logic circuit employed in the reversible electronic counter of FIGURE 1.

Referring now to the drawings and initially to FIGURE 1 thereof, the reversible counter comprises five counting elements 10–14 and three steering elements 15–17. The counter is adapted to count pulses supplied over conductor 19 from a source, not particularly shown. The pulses on conductor 19 may represent the number of places an information quantity is shifted to the left or right in a shift register during normalization.

Each of the counting elements 10–14 corresponds to one stage or one term of a binary progression generally represented by the series $$a^0+a^1+a^2+a^4+a^8 \ldots a^n \quad (1)$$

where $a$ is equal to the number 2.

From the above equation it is apparent that the counting element 10 has a weight of one, counting element 11 has the weight of two, counting element 12 has the weight of four, etc. The various weights associated with the binary counting elements are indicated by the reference indicia 1, 2, 4, 8 and 16. While a five stage binary counter is disclosed in the specification, it should be understood that the invention is, in its broadest aspects, not limited to a counter having a particular number of stages. Further, the teachings of the invention are applicable to counters employing other systems of binary coding, such as binary coded decimal, for example.

The counting elements are adapted to record the pulses supplied over conductor 19 and provide a representation of the count at any instant in time. The steering elements perform an auxiliary control function in that they properly condition the counting elements for the receipt of pulses. Each of the counting and steering elements comprises a bistable device settable to either of its stable states upon proper application of input signals thereto. As will be hereinafter more fully explained, the counting elements 10–14 simultaneously change state at the beginning of a pulse on conductor 19 while the steering elements 15–17 simultaneously change state at the end of the pulse.

Each of the counting and steering elements is provided by proper combinations of the logic blocks L, L1 and D. The logic block L comprises a PNP type transistor 20 having a collector 21, a base 22 and an emitter 23. The emitter 23 is referenced to ground by conductor 24. The collector 21 is connected in series with a collector or load resistor 25 to a negative terminal of a direct current voltage source $-V_A$. An output conductor 26 leads from the collector 21. When the transistor 20 is in its high impedance or non-conducting state, the output conductor 26 will be at a potential approximately equal to $-V_A$. However, when transistor 20 is rendered conductive, the voltage on output conductor 26 will quickly rise to approximately zero potential or ground. The conduction or impedance state of the transistor 20 is controlled by regulating the voltage on the base 22 with respect to the potential of emitter 23.

The base 22 of transistor 20 is connected in series with a biasing network 30 and an input network 31. The biasing network 30 comprises resistors 32, 33 and 34 which are connected in series with the opposite terminals of a direct current voltage source $V_B$. In a constructed embodiment of this logic circuit, the absolute value of the voltage source $V_B$ is approximately twice that of the voltage source $V_A$.

The input network 31 includes a plurality of parallel connected input conductors 35 each having a diode 36 disposed therein. The logic circuit is able to receive any number of input conductors 35 up to eight although only three are shown in the drawings. A speed-up network 37 comprising a clamp diode 38 and an overdrive capacitor 39 is also included in the logic circuit. The clamp diode 38 is connected between the emitter 23 and the base 24 of the transistor while the overdrive capacitor 39 is connected in series with this diode and in parallel with resistor 34.

Considering now the operation of this logic block, it will be assumed that ground represents the binary zero and the voltage level $-V_A$ corresponds to the binary one. When any or all of the input conductors 35 are referenced to ground, a low impedance path is provided for the flow of current through at least one of the diodes 36. The base 22 is maintained at a positive potential with respect to emitter 23 and transistor 20 does not conduct whereby the voltage on the output conductor 26 is approximately $-V_A$. When all of the input conductors 35 are simultaneously at a potential of $-V_A$ or at the binary one level, the base 22 of transistor 20 becomes negative with respect to the emitter thereof and transistor 20 is immediately rendered conductive. The output signal on conductor 26 rises to approximately zero potential.

When using negative pulse logic the transistor 20 is rendered conductive only when all of the input conductors are at the negative or binary one level. In this mode of operation, the logic block performs the Boolean And and invert functions. The signal on output conductor 26 is the inverse of the input signals in that when all of the input signals are at the $-V_A$ or binary one level the output signal is at ground or the binary zero level. At all other times the output signal is at approximately $-V_A$ or the binary one level.

When the output of a first logic block L is connected to and serves as an input to a similar logic block, the composite functioning of the two logic blocks can be viewed as an And function followed by an Or function. While negative pulse logic is employed in the illustrated embodiment of the invention, the logic circuits are also adapted to operate on positive pulse logic. In this case, a single logic block L would perform the Boolean Or and invert functions.

Figure 3:
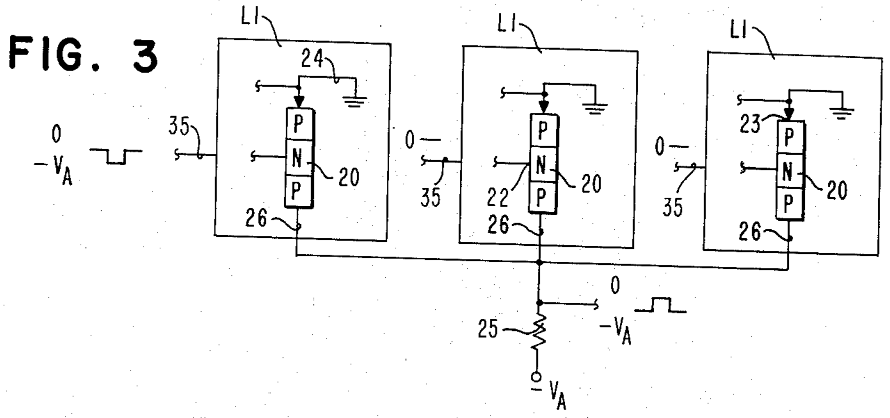
FIGURE 3 is a schematic circuit diagram showing a number of the logic blocks of FIGURE 2 connected to perform a dot Or logic function.

The logic blocks can be connected to perform a dot Or function by employing common collector or load resistors as is well known in the art. When logic blocks are dot Or'ed together, the collector on load resistor 25 is removed from a portion of the logic blocks. The symbol L1 represents a logic block which shares a common collector resistor 25. The arrangement is such that any one or more of the transistors is conducting the output of the dot Or'ed grouping rises to ground, effectively removing the $-V_A$ supply from the other transistors. The output from the grouping will be at the $-V_A$ level only when all transistors are non-conducting. This is shown in FIGURE 3 of the drawings.

Figure 4:
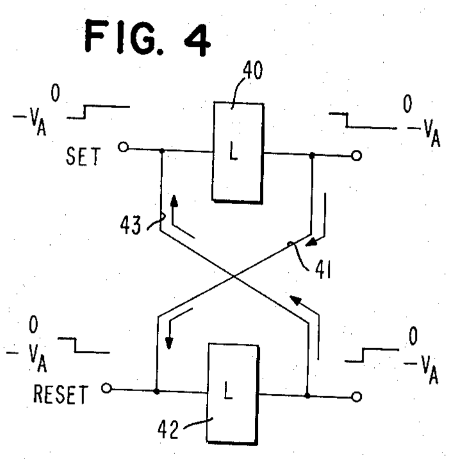
FIGURE 4 is a schematic circuit diagram showing two of the basic logic blocks of FIGURE 2 interconnected to provide a bistable binary storage device.

Two of the logic blocks L may be cross coupled to provide a bistable binary storage device. As shown in FIGURE 4, the output of logic block 40 is connected by a conductor 41 to the input of logic block 42. In a similar manner the output of logic block 42 is transmitted via conductor 43 and serves as an input to logic block 40. When a positive going signal is supplied to the input of logic block 40, a negative signal is evidenced on the output conductor associated therewith. This negative signal serves as an input to logic block 42 via conductor 41 and a positive signal is evidenced on the output conductor of this logic block. The positive output signal of logic block 42 is returned via conductor 43 to the input of logic block 40 and serves to lock the same in its present state. Further positive signals applied to the input of logic block 40 will not affect the outputs of the logic blocks 40 and 41.

The logic circuits 40 and 42 may be reset to their original states at any time by the application of a positive pulse to the input of logic block 42. In essence, a binary storage device settable to two stable states is provided by the cross coupling of the outputs of two logic circuits. The input to the logic block 40 corresponds to the set input conductor while the input to logic block 42 corresponds to the reset input conductor of a conventional bistable device. A more complete description of the logical operation of such a bistable device is found on pages 47–50 of a book by R. K. Richards, entitled "Arithmetic Operations in Digital Computers," published in 1955 by D. Van Nostrand Company, Inc.

Figure 5:
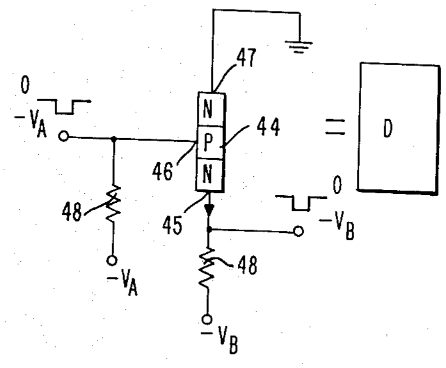
FIGURE 5 is a detailed circuit diagram of a non-inverting emitter follower used in the counter of FIGURE 1.

The logic block represented by the symbol D is a non-inverting power amplifier which provides a means for driving a large number of the logic blocks L or L1. As shown in FIGURE 5 of the drawings, the driver comprises an NPN type transistor 44 having an emitter 45, a base 46 and a collector 47. The collector 47 is referenced to ground while an input signal is applied over an input conductor to the base 46. The base is connected through a resistor 48 to the voltage source $-V_A$. An output conductor leads from the emitter 45 of transistor 44 and is referenced to the voltage $-V_B$ through resistor 48'.

When a negative pulse of $-V_A$ is applied to the input conductor, the potential level on the output conductor falls to a value sufficient to cause partial conduction of transistor 44. However, when the input conductor is at the binary one or zero potential level, the transistor is rendered fully conductive and the output conductor is referenced to the same potential level. The driver logic block is capable of powering at least ten of the logic blocks L or L1.

Each of the counting elements 10–14 comprises a pair of logic blocks 50 and 51 whose outputs are cross coupled to provide a bistable binary storage device. The outputs from the logic blocks are amplified by drivers 52 and serve as an indication of the count at any instant in time. For example, the output from logic block 50 and driver 52 of counting stage 10 will be at a negative level when a binary one is recorded in this stage of the counter. The output of driver 52 and logic block 51 of counting element 10 will be at ground (corresponding to the binary zero) at this time. However, when the counting element 10 has a binary zero recorded therein, the output of logic block 50 will be at the zero potential level and the output of logic block 51 will be at the negative voltage level.

To facilitate further description of the invention, the outputs of the counting element 10 are designated as 1 and $\overline{1}$. Similarly, the outputs of counting elements 11–14 are represented by 2—$\overline{2}$, 4—$\overline{4}$, 8—$\overline{8}$ and 16—$\overline{16}$, respectively. The counting elements provide not only a direct indication of the actual count stored therein at any particular instant of time, as represented by outputs 1, 2, 4, 8 and 16, but also the inverse thereof as represented by outputs $\overline{1}$, $\overline{2}$, $\overline{4}$, $\overline{8}$ and $\overline{16}$.

The three steering elements 15–17 each comprise a pair of logic blocks 54 and 55 whose outputs are cross coupled to define a bistable binary storage device. The output signals of the logic blocks 54 and 55 are passed through drivers 56 and define the steering signals S1, S2 and S3, and $\overline{S1}$, $\overline{S2}$ and $\overline{S3}$, respectively. The steering signals pre-condition the counting elements whereby the same simultaneously change state at the beginning of a pulse on conductor 19. The outputs from the counting elements indicate the count and also control the steering elements so that the same simultaneously change state at the end of a pulse.

Gating means comprising a plurality of L and/or L1 logic blocks are associated with each of the counting elements 10–14. Logic blocks 57 and 60 are dot Or'ed together and provide an input to the logic block 50 for the counting element 10. An input is provided for logic block 51 of this counting element 10 by logic blocks 58 and 59. An examination of each of the other counting elements 11–14 will show that a dot Or'ed pair of logic blocks (61—64, 62—63, 65—68, etc.) provides an input to each of the cross coupled logic blocks 50 or 51. These logic blocks are indicated by the reference numerals 57—76. In addition, logic blocks 77—80 are associated with the counting elements 10–12 to provide combinations of the steering signals to certain ones of the logic blocks 57—76.

The gating means for the steering elements 15–17 also includes a dot Or'ed pair of the L1 logic blocks for each of the cross coupled logic blocks 54—55. For example, in steering element 15, the logic blocks 83 and 86 provide the input signal to logic block 54 while the dot Or'ed pair 84 and 85 drive the logic block 55. These logic blocks are indicated by the numerals 83—94. Additionally, logic blocks 95—100 combine outputs of the counting elements to provide input signals to selected ones of the logic blocks 83—94.

The logic blocks 57, 58, 61, 62, 65, 66, 69, 70, 73 and 74 of the gating means associated with the counting elements and logic blocks 83, 84, 87, 88, 91 and 92 of the gating means associated with the steering elements are each supplied with a common input signal over forward control conductor 105. The remaining ones of these dot Or'ed pairs of logic blocks are connected with a reverse control conductor 106. The direction of counting is determined by the potential levels applied to the control conductors 105 and 106. The counter will count in the forward direction when a negative voltage is applied to forward control conductor 105. To reverse the direction of count, the negative voltage is removed from forward control conductor 105 and applied to reverse control conductor 106. The arrangement is such that one logic block of each dot Or'ed pair thereof associated with any cross coupled logic block in either a counting element or a steering element is responsive to a forward control signal. The other logic block of each pair is at least partially enabled when a negative potential is applied to reverse control conductor 106.

The negative pulses to be counted and appearing on conductor 19 are applied directly to each of the L1 logic blocks 57—76 of the counting elements through the non-inverting drivers 107 and 108. The inverse of the pulses to be counted serve as direct input signals to the L1 logic blocks 83—94 of the steering elements. The inversion of the pulses on conductor 19 is accomplished by logic block 110. As previously mentioned, a single logic block L having a single input performs an inverting function. A driver 111 is connected in series with the logic block 110 for power amplification purposes.

Figure 6:
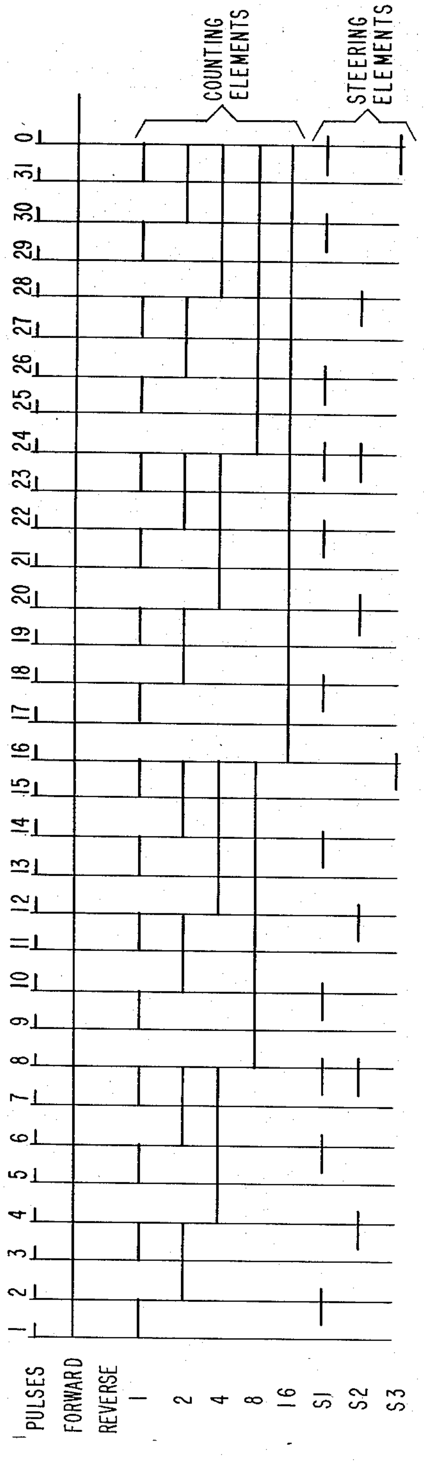
FIGURE 6 is a timing or sequence chart illustrating the relative timing of the counting and steering elements when the counter counts pulses from zero to its capacity in a forward direction.
Figure 7:
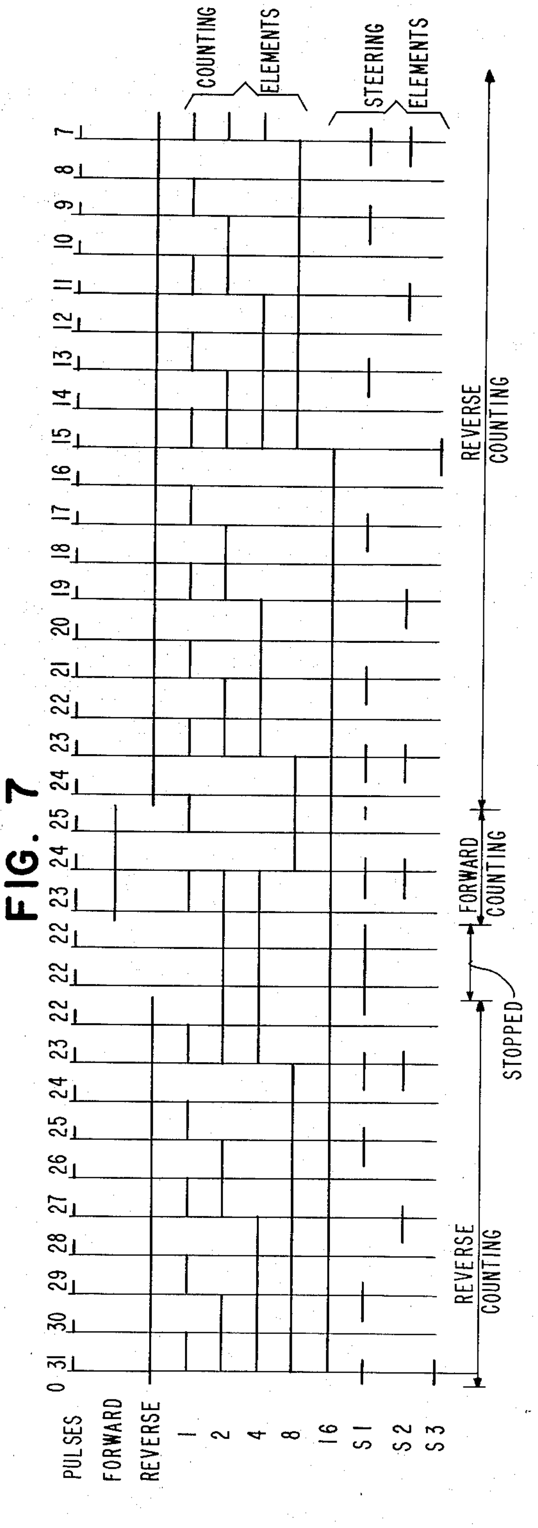
FIGURE 7 is a timing diagram indicating the operation of the counting and steering elements during a series of forward and reverse counting operations.

The remaining inputs to the gating means for the counting elements 10–14 comprise appropriate combinations of the steering signals S1, $\overline{S1}$, S2, $\overline{S2}$, S3 and $\overline{S3}$. In a similar manner, the other inputs to the gating means for the steering elements 15–17 are defined by combinations of the counting signals 1—16 and $\overline{1}$—$\overline{16}$. A portion of the logic blocks 57—76 controlling the counting elements are enabled when the leading edge of a negative pulse appears on conductor 19. However, the appropriate ones of the logic blocks 83—94 for the steering elements are not enabled until the end of a pulse on the conductor 19 since the inverse of this pulse is supplied thereto via logic block 110. The operation of the reversible counter as thus far described will perhaps best be understood when certain examples of counting operations are considered in connection with the sequence charts of FIGURES 6 and 7 of the drawings.

*Example 1.*—For the first example it is assumed that the counter is initially set at zero—i.e., the signals 1, 2, 4, 8 and 16 are at the positive level and a negative potential is applied to the forward control conductor 105 whereby the counter will count in a forward direction. The steering elements are also in a quiescent state in that the steering signals S1, S2 and S3 are at the positive or binary zero level while the inverse steering signals $\overline{S1}$, $\overline{S2}$ and $\overline{S3}$ are at the binary one level. With the appearance of a negative pulse on conductor 19, the logic block 57 is enabled and the counting signal 1 goes to the negative or binary one level. A count of one is now stored in the counter.

At the end of this pulse the logic block 83 receives the leading edge of a negative signal from inverter 110 to shift the state of the bistable device of steering element 15. Signal S1 goes to the negative or binary one level while steering signal $\overline{S1}$ rises to a positive level. The logic blocks 58 and 61 of the counting elements 10 and 11 are now partially enabled. The next pulse on conductor 19 will cause the states of counting elements 10 and 11 to reverse whereby a two is stored in the counter.

The counter will continue to count in a forward manner as long as the negative signal is applied to the forward control conductor 105 and until the capacity of the counter is reached. This arrangement is clearly shown by the sequence chart of FIGURE 6 of the drawings.

*Example 2.*—In this example it is assumed that the counter is full to capacity—the counting signals 1, 2, 4, 8 and 16 are all at the negative or binary one level—and that the forward control conductor 105 is energized. The steering signals S1 and S3 are at the negative or binary one level at this time.

The negative going leading edge of the next pulse on conductor 19 will enable logic blocks 58, 62, 66, 70 and 76. The reset inputs of each of the binary storage devices of the counting elements are energized and the counter is reset to zero. It will be noted that even though all of the counting elements change state, the total time required for the counting operation is equal to the time required for one of the bistable devices to be reset.

The counting signals 1—16 are now at the zero level which conditions logic blocks 84 and 92. When the pulse ends, the steering signals S1 and S3 return to the zero level. At this time, all counting signals 1—16 and steering signals S1—S3 are at the binary zero level.

*Example 3.*—With the counter initially set at zero, and a negative signal on the reverse control conductor 106, the counter will count in the reverse direction. The steering signals S1 and S3 are at the negative or binary one level due to the energization of logic blocks 86 and 94. The steering signals S1 and S3 and the reverse signal condition the logic blocks 60, 64, 68, 72 and 76 associated with the counting elements 10–14. When the negative pulse appears on conductor 19, these last-mentioned logic blocks are enabled to shift all of the counting elements to their binary one state. This, of course, indicates a count of thirty-one.

Subsequent pulses supplied to the conductor 19 will continue to cause the counter to count down. This is clealry shown in the left hand portion of the sequence chart of FIGURE 7 of the drawings.

*Example 4.*—As previously indicated, the direction of count can be changed at any time by reversing the energization of the forward and reverse control conductors 105 and 106. It is assumed that the forward control conductor 105 is at the negative level and the counter indicates a count of twenty-five. The counting signals 1, 8 and 16 and the steering element S1 will be at the negative or binary one level at this time.

To reverse the count the negative signal is removed from the forward control conductor 105 and applied to the reverse control conductor 106. This immediately energizes logic block 85 whereby steering element 15 is reset and the steering signal S1 goes to the binary zero level. When the next pulse appears on conductor 19, the counting element 10 is reset via logic block 60 whereby the counter now indicates a count of twenty-four. At the end of this pulse the steering elements S1 and S2 go to the negative or binary one level. The reverse counting is continued upon the occurrence of subsequent pulses as long as the reverse control conductor 106 is properly energized. It should be noted that when the direction of count is changed, only the steering elements change state and such changes occur simultaneously.

The direction of counting is changed between the application of successive pulses over conductor 19 to the counter. Should the reversal of count occur during the presence of the pulse, the number in the counter will be the same at the end of the pulse as it was at the beginning thereof although one may have been added or subtracted transiently during the pulse. In most applications, the time between adjacent pulses is greater than the time of the pulses themselves.

Means are provided for entering any desired number into the counter and for recycling or reversing the direction of count whenever a predetermined number of pulses have been counted. This means comprises the L1 logic blocks 115 and 116 whose outputs serve as inputs to the logic blocks 50 and 51 for each of the counting elements 10–14. Each of the logic blocks 115 and 116 has an input supplied thereto from a preset control conductor 117. The other input to each of the logic blocks 115 comes from a conductor 119 and the signal supplied thereto is the binary quantity to be placed in the associated counting element of the counter. The inverse of the signals on the conductors 119 are applied to logic blocks 116 via logic blocks 120.

For example, in counting element 10, logic block 115 provides an input to the set conductor while logic block 116 performs the same function for the reset conductor of the bistable binary storage device. To preset the counting stage 10 in a desired binary state, a negative signal is applied to preset control conductor 117 and the proper binary signal is entered over conductor 119. Regardless of the present state of this counting element, the same will assume the binary state corresponding to the signal on conductor 119. Since each of the counting elements 10–14 is provided with similar circuitry, any desired number can be entered into the counter over conductors 119 at any time by applying a negative voltage to preset control conductor 117.

The above-described arrangement provides a means for resetting the counter to zero at any time. Since the conductors 119 are normally referenced to ground, the binary zero level, it is only necessary to apply the negative voltage to preset control conductor 117 and the counter will immediately be reset. Thus, if it is desired to recycle the counter after a count which is less than the capacity of the counter, a negative pulse is applied to preset control conductor 117 when this number has been counted. The counting elements 10–14 will simultaneously change state followed immediately by a simultaneous change of the steering elements 15–17. The steering elements change state since the conductor 19 is at the positive level and a negative or binary one signal is supplied to each of the logic blocks 83—94.

It is also possible to automatically reset the counter after a predetermined count and an arrangement for accomplishing this is shown in FIGURE 1 of the drawings. A logic block 121 combines the steering signals S1 and S3 with a reset control signal and provides inputs to the logic blocks 51 of the counting elements 10 and 12 and logic blocks 60 and 68. When the reverse control conductor 106 is at the negative voltage level, the steering signals S1 and S3 are at the binary one level from the end of the zero pulse to the end of the next pulse. The leading edge of this next pulse would normally cause all counting elements to shift states whereby a count of thirty-one would be indicated.

However, when the reset control signal is applied, the signal from logic block 121 overrides the effect of the pulse to be counted and counting elements 10 and 12 remain in their present or zero states. The resulting count from the counter is twenty-six. Counting in the reverse direction continues until zero is reached and the counter is set at twenty-six by the next pulse as long as the control signal is present. Other combinations of steering and control signals may be employed to automatically reset the counter after any desired count in either the forward or reverse direction.

The inverse of the pulses to be counted are applied to the steering elements 15–17 via logic block 110 and driver block 111. If the logic block 110 is removed, the pulses themselves are applied to the steering elements. In this mode of operation the counting and steering elements rapidly and simultaneously change states in a cascading manner as long as the pulse is present on conductor 19. Such an arrangement may be used to time the length of a pulse, for example.

In the illustrated embodiment of the invention, the counter is shown to have five counting elements and three steering elements. It will be noted that all possible combinations of the steering elements have not been employed. A seven stage counter can be constructed employing three steering elements. The relationship between the number of counting and steering elements required is expressed by the following equation:

$$c=2^s-1 \qquad (2)$$

where:

$c$=number of counting elements
$s$=number of steering elements

The number of steering elements required for a counter of a given capacity or the capacity of a counter for a given number of steering elements is easily computed from this equation.

It should now be apparent that the objects initially set forth have been accomplished. Of particular importance is the provision of a reversible electronic counter wherein, during normal counting operations, the counting elements change state simultaneously at the beginning of a pulse while the steering elements change state simultaneously at the end of a pulse. The direction of count can be reversed or a desired binary quantity can be entered into the counter at any time. Further, the counter may be reset to zero whenever desired.

While the invention has been particularly described with reference to a preferred embodiment thereof, it will be understood by those skilled in the art that the foregoing and other changes in form and details may be made therein without departing from the spirit and scope of the invention.

What is claimed is:

1. A high speed binary counting circuit, comprising:
a plurality of counting and steering elements;
each of said elements having a bistable binary storage device, said counting elements being actuatable by the leading edge of a pulse to change states and said steering elements actuatable by the end of said pulse to change states;
each of the bistable binary storage devices having set and reset input conductors and a pair of output conductors;
the signals on the output conductors of the bistable binary storage devices of said counting elements providing counting signals indicating the count stored in said counting circuit;
the signals on the output conductors of the bistable binary storage devices of said steering elements providing steering signals;
a source of pulses to be counted;
first gating means for applying combinations of said steering signals and the pulses to be counted to the set and reset input conductors of each of said bistable binary storage devices of said counting elements; and
second gating means for applying combinations of said counting signals and the inverse of said pulses to be counted to the set and reset input conductors of each of said bistable storage devices of said steering elements.

2. Apparatus according to claim 1 having:
means to change the direction of count of said counting circuit;
said means to change comprising signal means for partially enabling one portion and disenabling a second portion of both said first and second gating means; and
only said bistable storage devices of said steering elements changing state when said signal means is energized to change the direction of count in the absence of a pulse from said source.

3. Apparatus according to claim 1 having:
means to recycle said counting circuit when a predetermined number less than the capacity of said counting circuit has been counted;
said means to recycle comprising a source of a recycling signal;
logic circuit means for combining said recycling signal and those steering signals corresponding to the counting of said predetermined number in said counting circuit; and
said logic circuit means providing input signals to at least a portion of said counting means which override the normal operation thereof to recycle said counting circuit upon the occurrence of the next pulse to be counted.

4. A high speed counting circuit, comprising:
a plurality of counting and steering elements;

each of said elements having a storage device settable to a plurality of stable states, said counting elements actuatable by the leading edge of the pulse to change state and said steering elements actuatable by the lagging edge of said pulse to change state;
the outputs of said counting elements providing counting signals indicating the count stored in said counting circuit;
the outputs of said steering elements providing steering signals;
a source of pulses to be counted;
first gating means for applying said pulses to be counted and combinations of said steering signals to the storage devices of said counting elements; and
second gating means for applying the inverse of said pulses to be counted and combinations of said counting signals to the storage devices of said steering elements.

5. A bidirectional counting circuit, comprising:
a plurality of counting and steering elements;
each of said elements comprising a storage device settable to a plurality of stable states, and counting elements actuatable by the leading edge of a pulse to change state and said steering elements actuatable by the lagging edge of said pulse;
the outputs of the storage devices for said counting elements providing an indication of the count;
first gating means for energizing each of said devices;
second gating means for energizing each of said devices;
a source of pulses to be counted;
a source of a forward control signal;
a source of a reverse control signal;
said first gating means for each of said counting elements providing combinations of the outputs of said steering elements, said pulses to be counted and said forward control signal;
said second gating means for each of said counting elements providing combinations of the outputs of said steering elements, said pulses to be counted and said reverse control signal;
said first gating means for each of said steering elements providing combinations of the outputs of said counting elements, said pulses to be counted and said forward control signal;
said second gating means for each of said steering elements providing combinations of the outputs of said counting elements, said pulses to be counted and said reverse control signal; and
the direction of count being controlled by the selective application of said forward and reverse control signals.

6. A bidirectional counting circuit, comprising:
a plurality of counting and steering elements;
each of said elements have a storage device settable to a plurality of stable states, said counting and steering elements being operatively actuated by the leading and lagging edges of an actuation pulse;
the outputs of the storage devices for said counting elements providing an indication of the count;
first gating means for energizing each of said devices;
second gating means for energizing each of said devices;
a source of pulses to be counted;
a source of a directional control signal;
said first gating means for each of said counting elements providing combinations of the outputs of said steering elements, said pulses to be counted and said directional control signal;
said second gating means for each of said counting elements providing combinations of the outputs of said steering elements, said pulses to be counted and said directional control signal;
said first gating means for each of said steering elements providing combinations of the outputs of said counting elements, said pulses to be counted and said forward control signal;

said second gating means for each of said steering elements providing combinations of the outputs of said counting elements, said pulses to be counted and said directional control signal; and the direction of count being controlled by the selective application of said directional control signal to said first and second gating means.

7. A counting circuit, comprising:

a plurality of counting and steering elements;

each of said elements having a storage device settable to a plurality of stable states, said counting and steering elements being individually actuated by different rise portions of the same pulse;

the outputs of said counting elements defining counting signals providing an indication of the count stored in said counter;

the outputs of said steering elements defining steering signals;

a source of pulses to be counted;

first gating means providing combinations of said steering signals and said pulses to be counted to the storage devices of said counting elements;

second gating means providing combinations of said counting signals and said pulses to be counted to the storage devices of said steering elements;

a source of a control signal;

logic circuit means for combining said control signal and ones of said steering signals; and said logic circuit means providing input signals to at least a portion of said storage devices for said counting means which override the effect of said first gating means to recycle said counting circuit when a predetermined count is recorded and said control signal is applied.

8. A counting circuit, comprising:

a plurality of counting and steering elements;

each of said elements having a storage device settable to a plurality of stable states, said counting storage devices actuatable by the leading edge of pulses to change states and said steering storage devices actuatable by the legging edge of said pulses to change states;

the outputs of said counting elements providing counting signals indicating the count stored in said counting circuit;

the outputs of said steering elements providing steering signals;

a source of pulses to be counted;

first gating means for applying said pulses to be counted and combinations of said steering signals to the storage devices of said counting elements; and second gating means for applying said pulses to be counted and combinations of said counting signals to the storage devices of said steering elements.

9. Apparatus according to claim 8 wherein the maximum number of counting elements for a given number of steering elements is expressed by the equation $$c=2^s-1$$

where:

$c$=number of counting elements
$s$=number of steering elements.

References Cited in the file of this patent

UNITED STATES PATENTS

| | | |
|---|---|---|
| 2,527,633 | Grignon | Oct. 31, 1950 |
| 2,745,006 | Chu et al. | May 8, 1956 |
| 2,823,856 | Booth et al. | Feb. 18, 1958 |
| 2,824,961 | Paininen | Feb. 25, 1958 |
| 2,880,934 | Bensky et al. | Apr. 7, 1959 |
| 2,954,168 | Maddox | Sept. 27, 1960 |
| 2,988,275 | Thomason | June 13, 1961 |
| 3,033,452 | Mayne | May 8, 1962 |

OTHER REFERENCES

"3rd Interim Progress Report on the Physical Realization of an Electronic Computing Instrument," January 1948, published by the Institute for Advanced Study, Princeton, New Jersey.

"The Logical Principles of a New Kind of Binary Counter," by W. H. Ware, from Proc. of the I.R.E., October 1953, pp. 1429–1437.